United States Patent
Kinoshito

(10) Patent No.: US 10,500,962 B2
(45) Date of Patent: Dec. 10, 2019

(54) VEHICLE CONTROL APPARATUS

(71) Applicant: SUBARU CORPORATION, Tokyo (JP)

(72) Inventor: Takahiro Kinoshito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 172 days.

(21) Appl. No.: 15/850,309

(22) Filed: Dec. 21, 2017

(65) Prior Publication Data

US 2018/0281601 A1   Oct. 4, 2018

(30) Foreign Application Priority Data

Mar. 28, 2017   (JP) .................................. 2017-062217

(51) Int. Cl.
*B60L 3/04* (2006.01)
*B60L 3/00* (2019.01)
*H04L 29/08* (2006.01)

(52) U.S. Cl.
CPC ............... *B60L 3/04* (2013.01); *B60L 3/0046* (2013.01); *H04L 67/12* (2013.01); *Y02T 10/7077* (2013.01); *Y02T 90/16* (2013.01); *Y10S 903/907* (2013.01)

(58) Field of Classification Search
CPC ....................................................... B60L 3/04
See application file for complete search history.

(56) References Cited

U.S. PATENT DOCUMENTS 6,278,202 B1 * 8/2001 Sakagawa ............. H02J 7/0063
                                                   307/46
9,479,000 B2 * 10/2016 Gu ...................... H01M 2/1027
(Continued)

FOREIGN PATENT DOCUMENTS

JP      2000-166024 A    6/2000
JP      2014-036557 A    2/2014
(Continued)

OTHER PUBLICATIONS

JPO Decision to Grant a Patent dated Feb. 12, 2019, with English translation.
(Continued)

*Primary Examiner* — Alex C Dunn
(74) *Attorney, Agent, or Firm* — McGinn IP Law Group, PLLC

(57) ABSTRACT

A vehicle control apparatus includes a switch, a first control unit, and a second control unit. The switch is switchable between an electrically conductive state that allows a first electricity storage device to be coupled to a power supply circuit and a cutoff state that allows the first electricity storage device to be isolated from the power supply circuit. The first control unit includes a first cutoff controller configured to transmit a cutoff signal to the switch and a self-diagnostic unit configured to detect a malfunction of the first cutoff controller. The second control unit is coupled to the first control unit through a communication network, and includes a second cutoff controller configured to transmit the cutoff signal to the switch. The second control unit is configured to transmit the cutoff signal from the second cutoff controller to the switch when the self-diagnostic unit detects the malfunction.

2 Claims, 12 Drawing Sheets

(56) References Cited

U.S. PATENT DOCUMENTS

| | | | |
|---|---|---|---|
| 2010/0244558 A1* | 9/2010 | Mitsutani | B60L 50/64 307/9.1 |
| 2014/0210262 A1* | 7/2014 | Yaegaki | B60K 6/48 307/10.1 |
| 2015/0331472 A1* | 11/2015 | Iwamoto | G06F 1/3212 713/323 |
| 2015/0357857 A1* | 12/2015 | Flock | B60L 3/04 318/504 |
| 2016/0009194 A1* | 1/2016 | Katayama | B60L 58/14 320/109 |
| 2016/0082849 A1* | 3/2016 | Yamasaki | B60L 1/00 290/3 |
| 2016/0097737 A1* | 4/2016 | Higuchi | G01N 27/4175 204/401 |
| 2016/0229309 A1 | 8/2016 | Mitsutani | |
| 2016/0294190 A1* | 10/2016 | Li | B60L 50/61 |

FOREIGN PATENT DOCUMENTS

| | | | | |
|---|---|---|---|---|
| JP | 2016-147517 A | | 8/2016 | |
| JP | 2016-193632 A | | 11/2016 | |
| JP | 2016-195472 A | | 11/2016 | |
| JP | 2017025709 A | * | 2/2017 | B60R 16/033 |
| JP | 2017-051036 A | | 3/2017 | |
| WO | WO-2014115209 A1 | * | 7/2014 | H02J 7/0024 |

OTHER PUBLICATIONS

Japanese Office Action, dated Sep. 11, 2018, in Japanese Application No. 2017-062217 and English Translation thereof.

Japanese Office Action, dated Dec. 11, 2018, in Japanese Application No. 2017-062217 and English Translation thereof.

\* cited by examiner

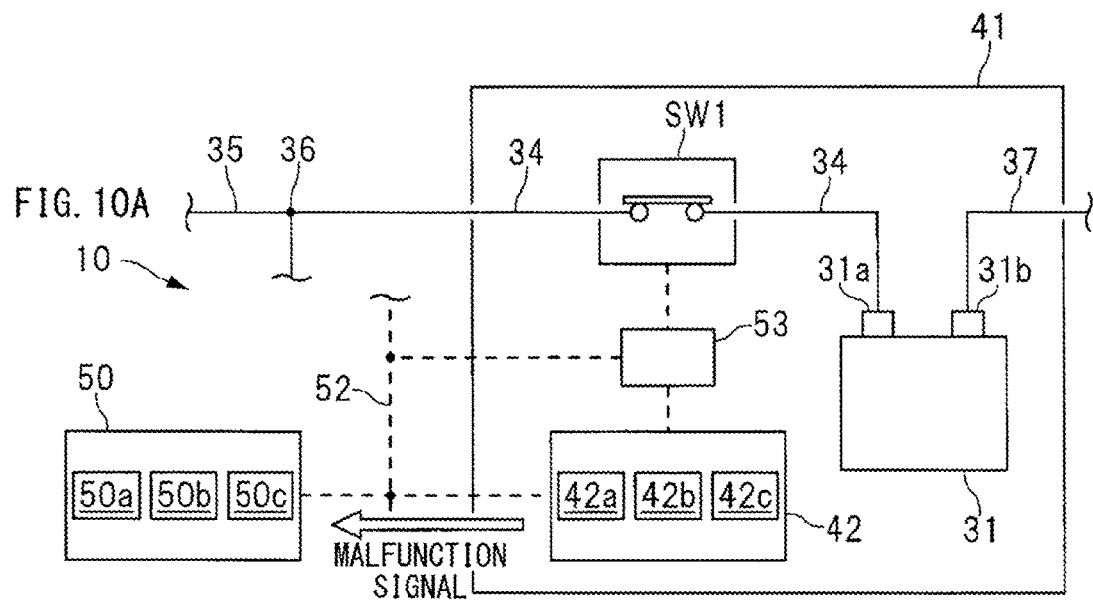
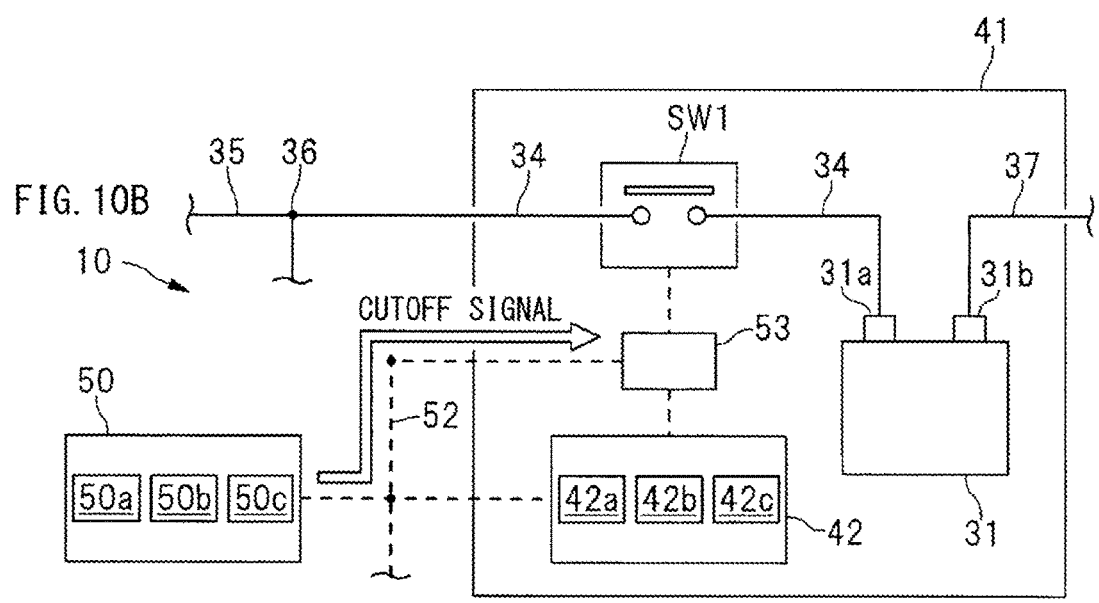

VEHICLE CONTROL APPARATUS

CROSS-REFERENCE TO RELATED APPLICATIONS

The present application claims priority from Japanese Patent Application No. 2017-062217 filed on Mar. 28, 2017, the entire contents of which are hereby incorporated by reference.

BACKGROUND

The technology relates to a vehicle control apparatus to be mounted on a vehicle.

A vehicle such as an automobile includes a power supply circuit. The power supply circuit is coupled to an electricity storage device such as a lithium-ion battery, and includes a switch such as a relay. Switching the switch allows for control of a connection state of the electricity storage device, as disclosed in Japanese Unexamined Patent Application Publication No. 2014-36557. For example, the switch is cut off to isolate the electricity storage device from the power supply circuit upon an excessive increase in a temperature of the electricity storage device, making it possible to protect the electricity storage device appropriately.

SUMMARY

A switch provided in a power supply circuit is controlled by a control unit that includes a microcomputer or the like. There is room for improvement in that, in the event of a malfunction in microcomputer functionality, etc., of the control unit, appropriate cutoff of the switch may possibly become difficult even despite the circumstances where an electricity storage device is to be protected from a factor such as a temperature increase. What is therefore desired is to protect the electricity storage device by appropriately cutting off the switch upon occurrence of the malfunction of the control unit.

It is desirable to provide a vehicle control apparatus that makes it possible to protect an electricity storage device by appropriately cutting off a switch of a power supply circuit.

An aspect of the technology provides a vehicle control apparatus to be mounted on a vehicle. The vehicle control apparatus includes: a switch switchable between an electrically conductive state that allows a first electricity storage device to be coupled to a power supply circuit and a cutoff state that allows the first electricity storage device to be isolated from the power supply circuit; a first control unit including a first cutoff controller and a self-diagnostic unit, in which the first cutoff controller is configured to transmit a cutoff signal to the switch, and the self-diagnostic unit is configured to detect a malfunction of the first cutoff controller; and a second control unit coupled to the first control unit through a communication network, and including a second cutoff controller configured to transmit the cutoff signal to the switch. The second control unit is configured to transmit the cutoff signal from the second cutoff controller to the switch when the self-diagnostic unit detects the malfunction of the first cutoff controller.

An aspect of the technology provides a vehicle control apparatus to be mounted on a vehicle. The vehicle control apparatus includes: a switch switchable between an electrically conductive state that allows a first electricity storage device to be coupled to a power supply circuit and a cutoff state that allows the first electricity storage device to be isolated from the power supply circuit; a first control unit configured to transmit a cutoff signal to the switch, and detect its own malfunction; and a second control unit coupled to the first control unit through a communication network, and configured to transmit the cutoff signal to the switch when the first control unit detects the own malfunction.

BRIEF DESCRIPTION OF THE DRAWINGS

FIGS. 10A and 10B illustrate an example of a course of cutting off the switch SW1 by means of the fail-safe control.

DETAILED DESCRIPTION

Figure 1:
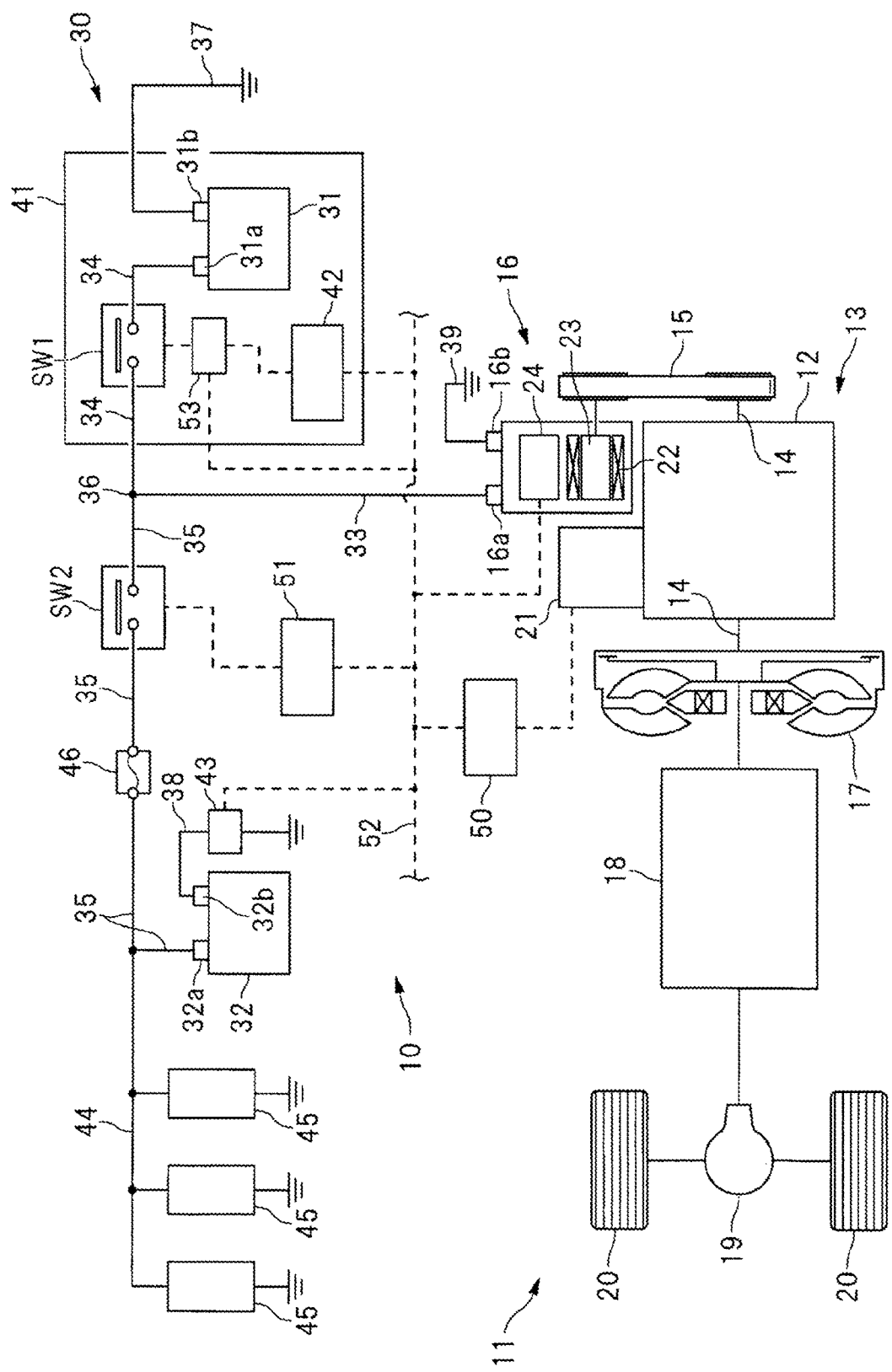
FIG. 1 schematically illustrates a vehicle provided with a vehicle control apparatus according to one implementation of the technology.

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

FIG. 1 is a schematic diagram illustrating a vehicle 11 provided with a vehicle control apparatus 10 according to an example implementation of the technology. Referring to FIG. 1, the vehicle 11 may be mounted with a power unit 13 that includes an engine 12. The engine 12 may include a crankshaft 14 that is coupled to a motor generator 16 via a belt mechanism 15. The engine 12 may also be coupled to a transmission mechanism 18 via a torque converter 17. The transmission mechanism 18 may be coupled to wheels 20 via a member such as a differential mechanism 19. The engine 12 may further include auxiliary equipment 21 such as a throttle valve, an injector, and an igniter.

The motor generator 16 coupled to the engine 12 may be a so-called integrated starter generator (ISG) that serves both as an electric generator and an electric motor. The motor generator 16 may serve not only the electric generator to be driven by the engine 12 but may also serve as the electric motor that starts and revolves the engine 12 upon, for example, an idling stop control. The motor generator 16 may also serve as the electric motor that assists the engine 12 upon, for example, start and acceleration. The motor generator 16 may include a stator 22 having a stator coil and a rotor 23 having a field coil. The motor generator 16 may further include an ISG controller 24 in order to control an electrically conductive state of each of the stator coil and the field coil. The ISG controller 24 may include components such as an inverter, a regulator, and a microcomputer. The ISG controller 24 may control the electrically conductive state of each of the field coil and the stator coil, thus controlling a state of the motor generator 16 such as a power-generation state and a powering state.

[Power Supply Circuit]

Figure 2:
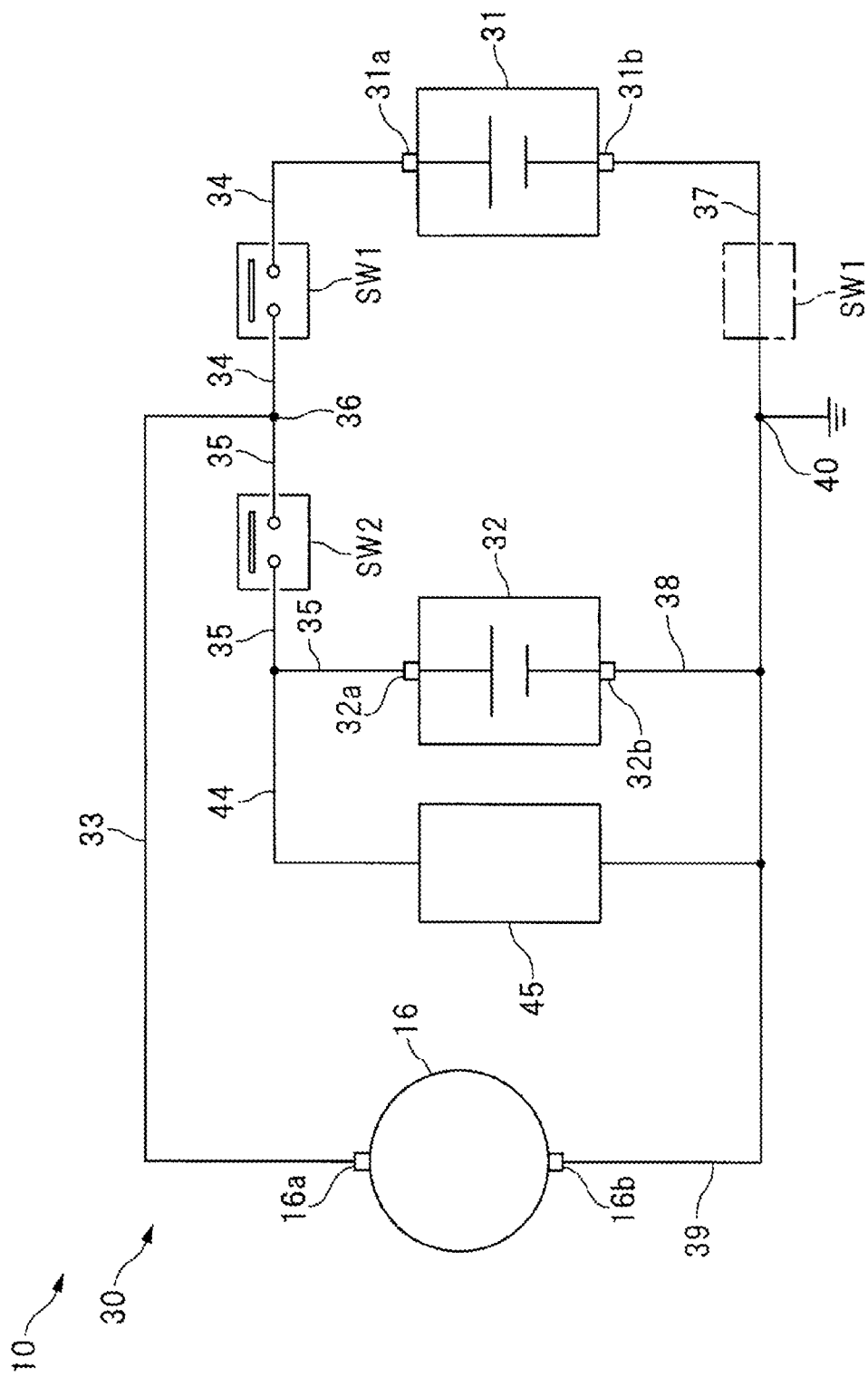
FIG. 2 is a circuit diagram illustrating an example of a power supply circuit.

A description is given of a power supply circuit 30 included in the vehicle control apparatus 10. FIG. 2 is a circuit diagram illustrating an example of the power supply circuit 30. Referring to FIG. 2, a lithium-ion battery 31 and a lead battery 32 may be configured to be coupled to the power supply circuit 30. In one implementation, the lithium-ion battery 31 may serve as a "first electricity storage device". In one implementation, the lead battery 32 may serve as a "second electricity storage device". The lithium-ion battery 31 and the lead battery 32 may be configured to be electrically coupled to the motor generator 16 in parallel to each other. The lithium-ion battery 31 may have a terminal voltage that is designed higher than a terminal voltage of the lead battery 32 in order to actively discharge the lithium-ion battery 31. Further, the lithium-ion battery 31 may have internal resistance that is designed smaller than internal resistance of the lead battery 32 in order to actively charge and discharge the lithium-ion battery 31.

The motor generator 16 may include a positive electrode terminal 16a coupled to a positive electrode line 33. The lithium-ion battery 31 may include a positive electrode terminal 31a coupled to a positive electrode line 34. The lead battery 32 may include a positive electrode terminal 32a coupled to a positive electrode line 35. These positive electrode lines 33 to 35 may be coupled to one another via a node 36. The lithium-ion battery 31 may include a negative electrode terminal 31b coupled to a negative electrode line 37. The lead battery 32 may include a negative electrode terminal 32b coupled to a negative electrode line 38. The motor generator 16 may include a negative electrode terminal 16b coupled to a negative electrode line 39. These negative electrode lines 37 to 39 each may be coupled to a reference potential point 40.

The positive electrode line 34 of the lithium-ion battery 31 may be provided with a switch SW1. The switch SW1 may be switched between an electrically conductive state and a cutoff state. Switching the switch SW1 to the electrically conductive state may allow the lithium-ion battery 31 to be coupled to the power supply circuit 30, whereas switching the switch SW1 to the cutoff state may allow the lithium-ion battery 31 to be isolated from the power supply circuit 30. Further, the positive electrode line 35 of the lead battery 32 may be provided with a switch SW2. The switch SW2 may be switched between an electrically conductive state and a cutoff state. The switch SW1 and the switch SW2 each may be controlled by a battery controller 42 and a main controller 51 that are described later. The switch SW1 and the switch SW2 each may be configured by a semiconductor element such as, but not limited to, a metal-oxide-semiconductor field-effect transistor (MOSFET). In an alternative implementation, the switch SW1 and the switch SW2 each may be a mechanical switch that opens and closes a contact by means of electromagnetic force, for example. Note that the switch SW1 and the switch SW2 are each referred to as a relay or a contact as well, for example.

The power supply circuit 30 may include a battery module 41. The lithium-ion battery 31 and the switch SW1 may be incorporated into the battery module 41. The battery module 41 may further include the battery controller 42. The battery controller 42 may include a microcomputer, for example. The battery controller 42 may have a monitoring function and a control function. Non-limiting examples of the monitoring function may include monitoring of a state of charge SOC, charge and discharge currents, a terminal voltage, and a cell temperature of the lithium-ion battery 31. Non-limiting examples of the control function may include controlling the switching of the switch SW1. Further, the negative electrode line 38 of the lead battery 32 may be provided with a battery sensor 43. The battery sensor 43 may have a detection function. Non-limiting examples of the detection function may include detection of a state of charge SOC, charge and discharge currents, and a terminal voltage of the lead battery 32. Moreover, the positive electrode line 35 of the lead battery 32 may be coupled to a plurality of electric devices 45 via a positive electrode line 44. The positive electrode line 35 may also be provided with a fuse 46 that protects components such as the electric devices 45. Note that the state of charge SOC refers to a ratio of an electricity storage amount of the battery to a designed capacity of the battery.

[Control System]

The vehicle control apparatus 10 may be provided with a plurality of controllers as illustrated in FIG. 1. The controllers each may include a microcomputer, for example. Non-limiting examples of the controller may include the ISG controller 24 that controls the motor generator 16 and the battery controller 42 that controls the battery module 41 as described above. Non-limiting examples of the controller may also include an engine controller 50 that controls the engine 12 and a main controller 51 that controls, in an overall fashion, the ISG controller 24, the battery controller 42, and the engine controller 50. It is to be noted that, in an example implementation, the main controller 51 has a function of controlling the switching of the switch SW2, in addition to the overall control of the ISG controller 24, the battery controller 42, and the engine controller 50.

The ISG controller 24, the battery controller 42, the engine controller 50, and the main controller 51 and various sensors may be so coupled to one another as to be able to perform a communication mutually and freely via a communication network 52. The main controller 51 may determine control target values directed to the components such as the engine 12, the motor generator 16, and the battery module 41 on the basis of pieces of data transmitted from the various sensors the controllers, and transmit the control target values to the engine controller 50, the ISG controller 24, and the battery controller 42. The engine controller 50, the ISG controller 24, and the battery controller 42 each may control an operating state of corresponding one of the engine 12, the motor generator 16, and the battery module 41, on the basis of the corresponding control target value received from the main controller 51. Non-limiting examples of the communication network 52 may include a controller area network (CAN) and a local interconnect network (LIN).

[Charge and Discharge of Lithium-Ion Battery]

Figure 3:
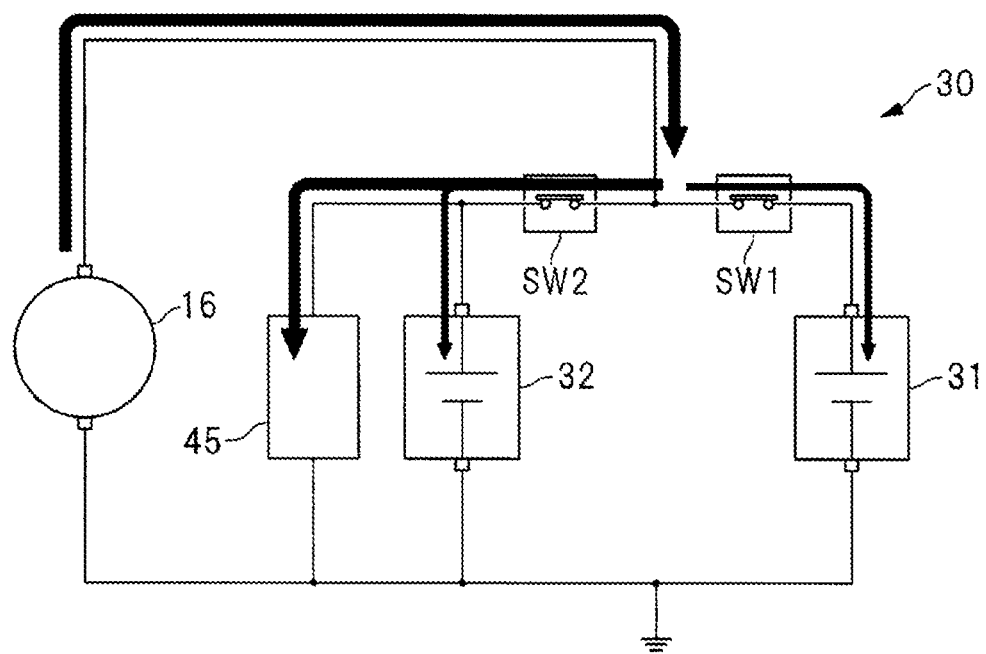
FIG. 3 describes an example of a charge-discharge situation of a lithium-ion battery.
Figure 4:
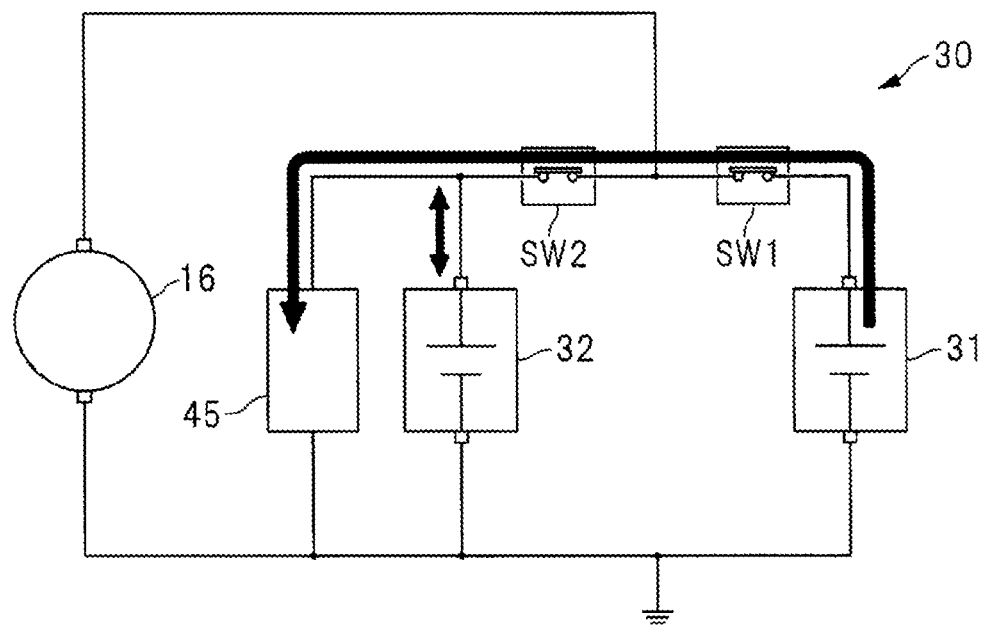
FIG. 4 describes an example of the charge-discharge situation of the lithium-ion battery.
Figure 5:
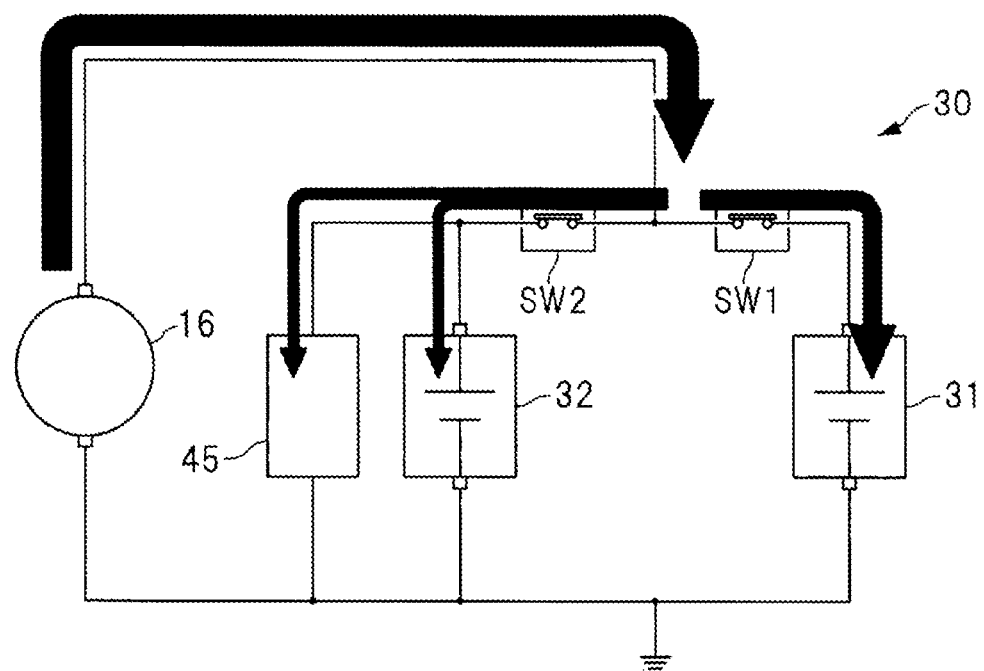
FIG. 5 describes an example of the charge-discharge situation of the lithium-ion battery.

A description is given of charge-discharge situations of the lithium-ion battery 31 in association with a power-generation control and a powering control of the motor generator 16. FIGS. 3 to 5 each illustrate an example of the charge-discharge situation of the lithium-ion battery 31. FIG. 3 describes an example of a situation in which the motor generator 16 is controlled into a combustion power-generation state. FIG. 4 describes an example of a situation in which the motor generator 16 is controlled into a power-generation suspended state. FIG. 5 describes an example of a situation in which the motor generator 16 is controlled into a regenerative power-generation state.

Referring to FIG. 3, in an example case where the state of charge SOC of the lithium-ion battery 31 falls below a predetermined lower limit, the motor generator 16 may be controlled into the combustion power-generation state, in order to charge the lithium-ion battery 31 for enhancement of the state of charge SOC. When the motor generator 16 is controlled into the combustion power-generation state, an electric power-generation voltage of the motor generator 16 may be raised above the terminal voltage of the lithium-ion battery 31. This causes the motor generator 16 to supply generated electric power to components such as the lithium-ion battery 31, the electric device 45, and the lead battery 32, as indicated by black arrows in FIG. 3.

Referring to FIG. 4, in an example case where the state of charge SOC of the lithium-ion battery 31 exceeds a predetermined upper limit, the motor generator 16 may be controlled into the power-generation suspended state, in order to facilitate discharge of the lithium-ion battery 31 for reduction in an engine load. When the motor generator 16 is controlled into the power-generation suspended state, the electric power-generation voltage of the motor generator 16 may be lowered below the terminal voltage of the lithium-ion battery 31. This causes electric power to be supplied to components such as the electric device 45 from the lithium-ion battery 31, as indicated by a black arrow in FIG. 4. Therefore, it becomes possible to suppress or stop the electric power generation of the motor generator 16, thus allowing for reduction in the engine load.

As described above, the motor generator 16 may be controlled into the state such as the combustion power-generation state and the power-generation suspended state on the basis of the state of charge SOC. Upon deceleration traveling, it is advantageous to collect large kinetic energy for enhancement of a fuel consumption performance. Accordingly, upon coasting traveling where an accelerator pedal that has been pressed down is released and braking of the vehicle 11 where a brake pedal is pressed down, the motor generator 16 may be controlled into the regenerative power-generation state to largely increase the electric power-generation voltage of the motor generator 16. This enables a large amount of generated electric power to be supplied from the motor generator 16 to the lithium-ion battery 31 as indicated by black arrows in FIG. 5. Hence, it becomes possible to collect electric energy that has been actively converted from the kinetic energy, thus making it possible to enhance an energy efficiency of the vehicle 11 and thereby to improve the fuel consumption performance of the vehicle 11. Note that much of a generated current may be supplied to the lithium-ion battery 31 owing to the internal resistance of the lithium-ion battery 31 which is smaller than the internal resistance of the lead battery 32.

As illustrated in FIGS. 3 to 5, when the motor generator 16 is controlled into the combustion power-generation state, the regenerative power-generation state, or the power-generation suspended state, the switch SW1 and the switch SW2 may be held in the electrically conductive state. In other words, in the vehicle control apparatus 10, it is possible to control the charge and discharge of the lithium-ion battery 31 simply by controlling the electric power-generation voltage of the motor generator 16, without controlling the switching between the switch SW1 and the switch SW2. This makes it possible to easily control the charge and discharge of the lithium-ion battery 31, and to improve durability of the switch SW1 and the switch SW2.

[Switching Control of Switches SW1 and SW2]

Figure 6:
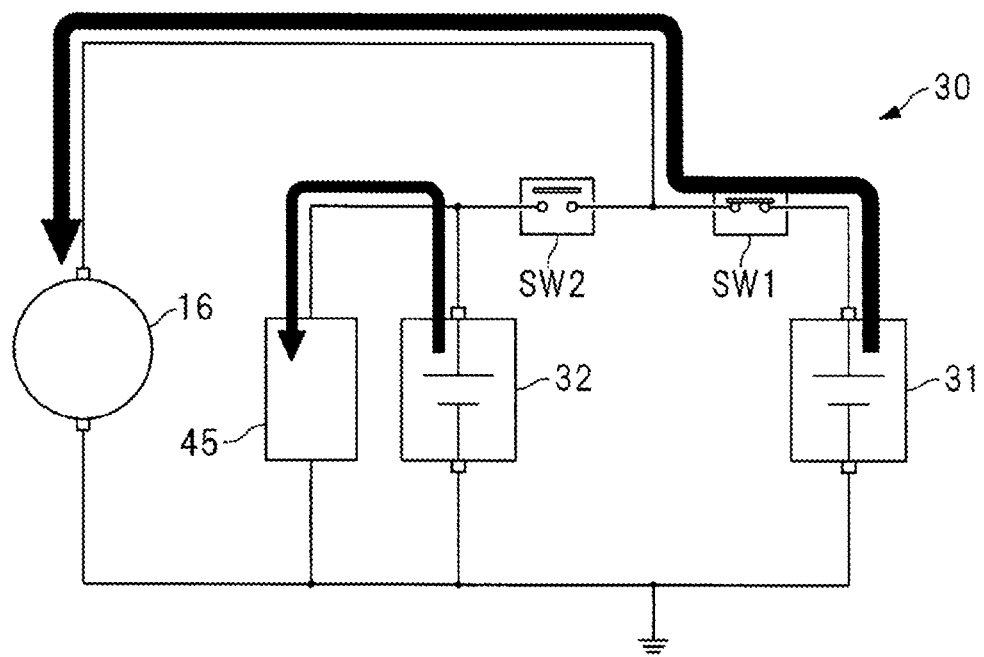
FIG. 6 describes a situation where a switch SW2 is switched to a cutoff state.
Figure 7:
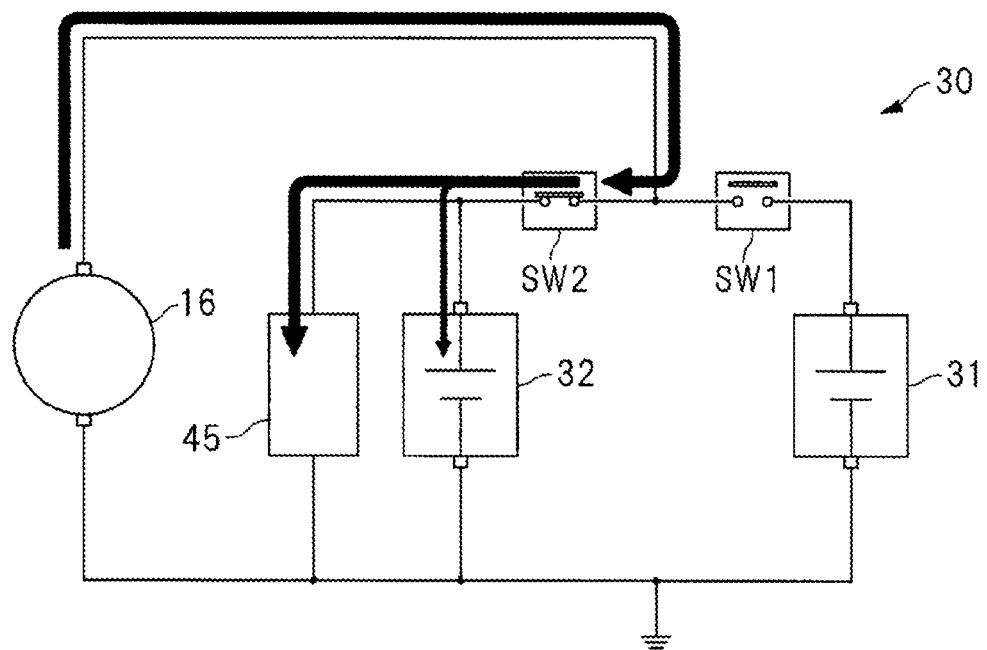
FIG. 7 describes a situation where a switch SW1 is switched to a cutoff state.

FIG. 6 describes a situation where the switch SW2 is switched to the cutoff state. FIG. 7 describes a situation where the switch SW1 is switched to the cutoff state. Referring to FIG. 6, when the motor generator 16 is controlled into the powering state, the switch SW2 may be switched from the electrically conductive state to the cutoff state. In other words, in an example case where the motor generator 16 starts and revolves the engine 12, or where the motor generator 16 performs assist driving of the engine 12, the switch SW2 may be switched from the electrically conductive state to the cutoff state. This makes it possible to prevent instantaneous voltage drop for components such as the electric device 45 even in an example case where a large current is supplied to the motor generator 16 from the lithium-ion battery 31. This enables the components such as the electric device 45 to function properly.

Referring to FIG. 7, the switch SW1 may be switched from the electrically conductive state to the cutoff state upon protecting the lithium-ion battery 31. For example, when the battery controller 42 that monitors factors including the charge current, the discharge current, and the cell temperature of the lithium-ion battery 31 detects any of such factors that exceeds its upper limit, the switch SW1 may be switched from the electrically conductive state to the cutoff state to isolate the lithium-ion battery 31 from the power supply circuit 30. This stops the charge and discharge of the lithium-ion battery 31, making it possible to protect the lithium-ion battery 31 from a factor such as, but not limited to, excessive charge and discharge currents and an excessive increase in temperature. Further, the lead battery 32 is coupled to the components such as the motor generator 16 and the electric device 45 even when the switch SW1 is switched to the cutoff state as illustrated in FIG. 7, making it possible to continue the supply of electric power to the components such as the electric device 45 and thereby to maintain traveling performance of the vehicle 11.

[Fail-Safe Function of Switch SW1]

A description is given of a fail-safe function of the switch SW1 according to an example implementation. The power supply circuit 30 may include the switch SW1 that isolates the lithium-ion battery 31 in order to protect the lithium-ion battery 31 from a factor such as the excessive charge and discharge currents and the excessive increase in temperature as described above. The switching of the switch SW1 may be controlled by the battery controller 42. However, in the unlikely event of a malfunction in a factor such as, but not limited to, microcomputer functionality of the battery controller 42, it is difficult to appropriately cutoff the switch SW1 under circumstances where the battery protection is necessary. Accordingly, the vehicle control apparatus 10 has the fail-safe function for the appropriate cutoff of the switch SW1 even upon occurrence of the malfunction of the battery controller 42 or any other component of the vehicle 11.

Figure 8:
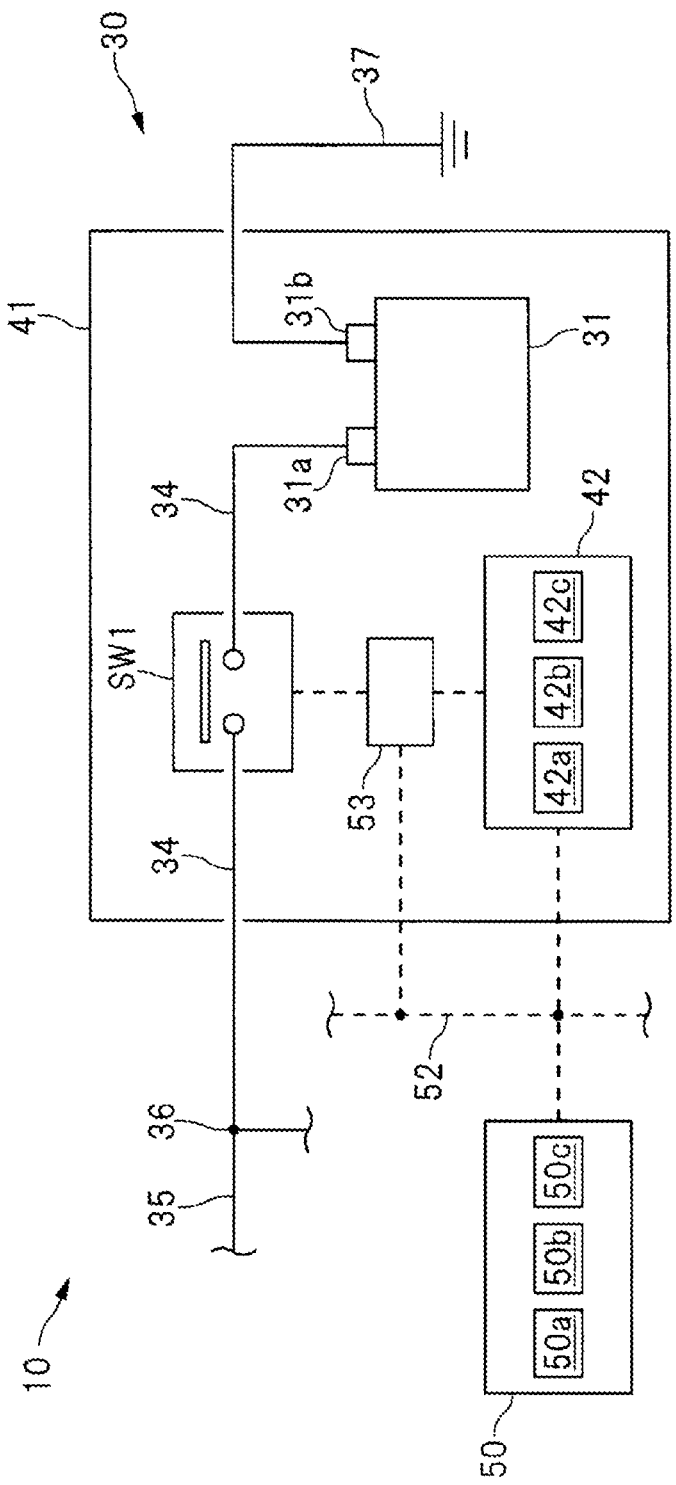
FIG. 8 schematically illustrates a control system of the switch SW1.

FIG. 8 schematically illustrates a control system of the switch SW1 according to an example implementation. Referring to FIG. 8, the battery controller 42 that controls the battery module 41 and the engine controller 50 that controls the engine 12 may be so coupled to each other via the communication network 52 as to be able to perform the communication with each other freely. The communication network 52 may be, for example but not limited to, the CAN, the LIN, or any other suitable network. In one implementation, the battery controller 42 may serve as a "first control unit". In one implementation, the engine controller 50 may serve as a "second control unit". The battery module 41 may include a drive circuit 53 that supplies a control current to the switch SW1. The control current may be directed to the switching of the switch SW1. The drive circuit 53 may be so coupled to the battery controller 42 as to be able to perform the communication with the battery controller 42 freely. In addition thereto, the drive circuit 53 may be so coupled to the engine controller 50 via the communication network 52 as to be able to perform the communication with the engine controller 50 freely.

The battery controller 42 may have functional units such as, but not limited to, a first switch controller 42a, a self-diagnostic unit 42b, and a response transmitter 42c. In one implementation, the first switch controller 42a may serve as a "first cutoff controller". The first switch controller 42a may set a control target value of the switch SW1 on the basis of the factor such as the charge current, the discharge current, and the cell temperature of the lithium-ion battery 31, and may transmit an electric-conduction signal or a cutoff signal to the drive circuit 53. In other words, the first switch controller 42a may set the electrically conductive state or the cutoff state for the switch SW1 on the basis of the factor. Transmitting the electric-conduction signal from the first switch controller 42a to the drive circuit 53 may cause the switch SW1 to be controlled into the electrically conductive state by the drive circuit 53, whereas transmitting the cutoff signal from the first switch controller 42a to the drive circuit 53 may cause the switch SW1 to be controlled into the cutoff state by the drive circuit 53.

The self-diagnostic unit 42b of the battery controller 42 may contain a predetermined diagnostic program that allows for making of a diagnosis as to whether the first switch controller 42a is normal. When a determination is made that the first switch controller 42a is normal, the self-diagnostic unit 42b may transmit a normal signal to the engine controller 50. The self-diagnostic unit 42b may transmit a malfunction signal to the engine controller 50 when a determination is made that the first switch controller 42a is malfunctioning. Further, the response transmitter 42c of the battery controller 42 may contain a response program that allows for transmission of a predetermined response signal to the engine controller 50. When a confirmation signal is received, the response transmitter 42c may transmit, in accordance with the response program, the predetermined response signal indicating that the self-diagnostic unit 42b is normal. The confirmation signal may be transmitted from a later-described function monitor 50a of the engine controller 50. In other words, the predetermined response signal may be transmitted from the response transmitter 42c of the battery controller 42 to the function monitor 50a of the engine controller 50 in response to the transmission of the confirmation signal from the function monitor 50a of the engine controller 50 to the response transmitter 42c of the battery controller 42, where the self-diagnostic unit 42b of the battery controller 42 functions normally.

The engine controller 50 may have functional units such as, but not limited to, the function monitor 50a, a communication monitor 50b, and a second switch controller 50c. In one implementation, the second switch controller 50c may serve as a "second cutoff controller". The function monitor 50a of the engine controller 50 may contain a predetermined monitoring program that allows for detection of a malfunction of the first switch controller 42a and a malfunction of the self-diagnostic unit 42b. When the function monitor 50a receives the malfunction signal from the self-diagnostic unit 42b of the battery controller 42, the function monitor 50a may determine that the first switch controller 42a of the battery controller 42 is malfunctioning. The function monitor 50a may also determine that the self-diagnostic unit 42b of the battery controller 42 is malfunctioning, when the function monitor 50a is unable to receive the response signal normally from the response transmitter 42c after the transmission of the confirmation signal to the response transmitter 42c. In an example implementation, the function monitor 50a may determine that the self-diagnostic unit 42b is malfunctioning when the reception of the response signal itself is not successful, or when the received response signal is erroneous. Further, the communication monitor 50b of the engine controller 50 may contain a predetermined monitoring program that allows for detection of a malfunction of the communication network 52. The communication monitor 50b may detect the malfunction of the communication network 52, i.e., may detect an abnormality of the communication performed between the engine controller 50 and the battery controller 42, on the basis of a status of transmission and reception of communication data performed through the communication network 52.

The second switch controller 50c of the engine controller 50 may transmit, to the drive circuit 53, the cutoff signal directed to the switch SW1 on the basis of the control signal supplied from the function monitor 50a or the control signal supplied from the communication monitor 50b. In other words, in an example implementation, the cutoff signal directed to the switch SW1 may be transmitted from the second switch controller 50c to the drive circuit 53 when the malfunction of the first switch controller 42a is detected by the function monitor 50a, when the malfunction of the self-diagnostic unit 42b is detected by the function monitor 50a, or when the malfunction of the communication network 52 is detected by the communication monitor 50b. It is to be noted that the drive circuit 53 is coupled to both the first switch controller 42a and the second switch controller 50c. In an example implementation, the second switch controller 50c of the engine controller 50 may take priority over the first switch controller 42a of the battery controller 42. In other words, even when the first switch controller 42a transmits the electric-conduction signal to the drive circuit 53, the priority may be given to the second switch controller 50c and the switch SW1 may be thus switched to the cutoff state when the second switch controller 50c transmits the cutoff signal to the drive circuit 53.

[Execution Procedure for Fail-Safe Control]

Figure 9:
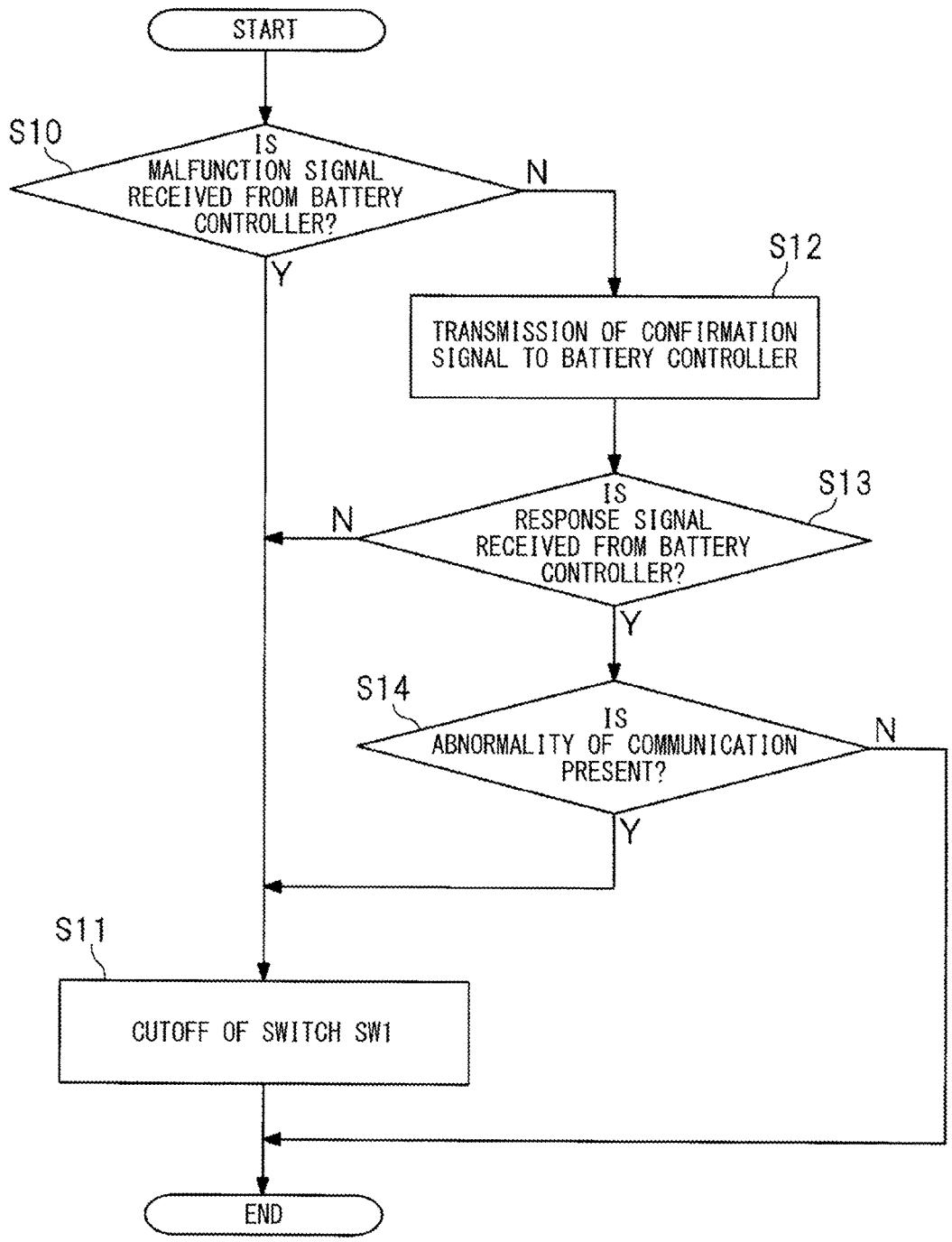
FIG. 9 is a flowchart illustrating an example of a procedure for execution of a fail-safe control.

A description is given next of a procedure for execution of the fail-safe control that cuts off the switch SW1 according to an example implementation. FIG. 9 is a flowchart illustrating an example of the procedure for the execution of the fail-safe control. Steps in the flowchart illustrated in FIG. 9 may be performed by the engine controller 50 at every predetermined cycle. FIG. 10A to FIG. 12B each illustrate an example of a course of cutting off the switch SW1 by means of the fail-safe control.

Referring to FIG. 9, a determination may be made in step S10 as to whether the function monitor 50a of the engine controller 50 has received the malfunction signal transmitted from the self-diagnostic unit 42b of the battery controller 42. A flow may proceed to step S11 when the determination is made in step S10 that the engine controller 50 has received the malfunction signal, i.e., when the first switch controller 42a of the battery controller 42 is determined as being malfunctioning (step S10: Y). In step S11, the cutoff signal may be transmitted from the second switch controller 50c to the switch SW1, causing the switch SW1 to be switched to the cutoff state by the engine controller 50.

Referring specifically to FIG. 10A, when the malfunction signal is transmitted from the battery controller 42 to the engine controller 50, it is difficult to control the switch SW1 by the battery controller 42 in consideration of a situation where the first switch controller 42a is malfunctioning. Hence, the cutoff signal may be transmitted from the second switch controller 50c of the engine controller 50 to the drive circuit 53 as illustrated in FIG. 10B to thereby cause the switch SW1 to be switched from the electrically conductive state to the cutoff state by the engine controller 50. Thus, the switch SW1 may be cut off in advance by the engine controller 50 as an alternative controller when the battery controller 42 involves difficulties in controlling the switch SW1, making it possible to protect the lithium-ion battery 31 appropriately.

Referring back to FIG. 9, the flow may proceed to step S12 when the determination is made in step S10 that the engine controller 50 has not received the malfunction signal, i.e., when the first switch controller 42a of the battery controller 42 is determined as being normal (step S10: N). In step S12, the predetermined confirmation signal may be transmitted from the function monitor 50a of the engine controller 50 to the self-diagnostic unit 42b of the battery controller 42. Thereafter, a determination may be made in step S13 as to whether the function monitor 50a of the engine controller 50 has received the response signal from the response transmitter 42c of the battery controller 42. The flow may proceed to step S11 when the determination is made in step S13 that the engine controller 50 has not received the response signal properly, i.e., when the self-diagnostic unit 42b of the battery controller 42 is determined as being malfunctioning (step S13: N). In step S11, the cutoff signal may be transmitted from the second switch controller 50c to the switch SW1, causing the switch SW1 to be switched to the cutoff state by the engine controller 50.

Figure 11A:
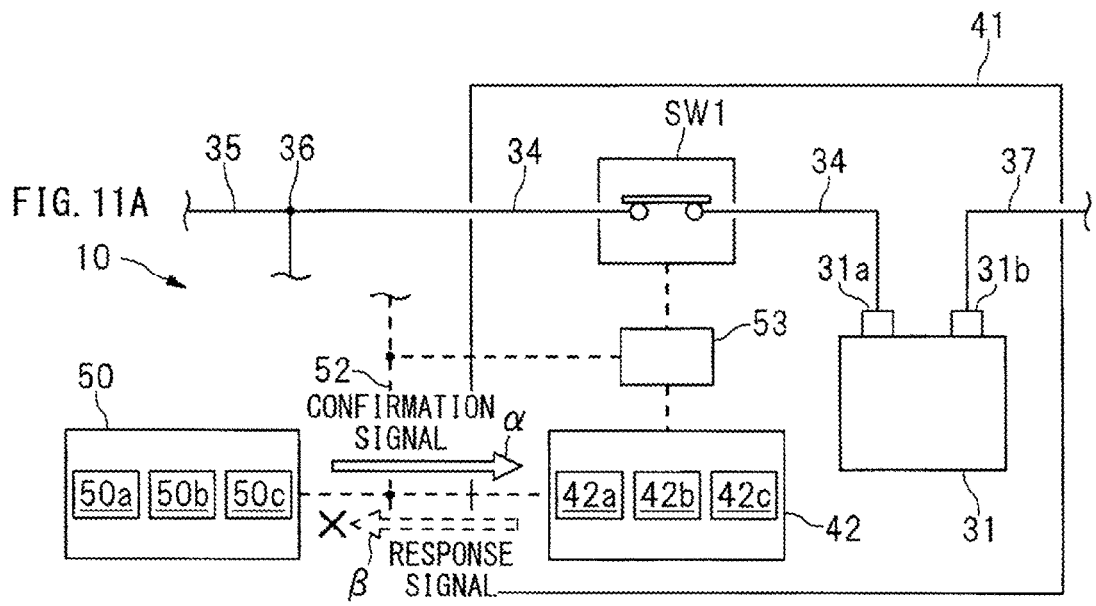
FIGS. 11A and 11B illustrate an example of the course of cutting off the switch SW1 by means of the fail-safe control.
Figure 11B:
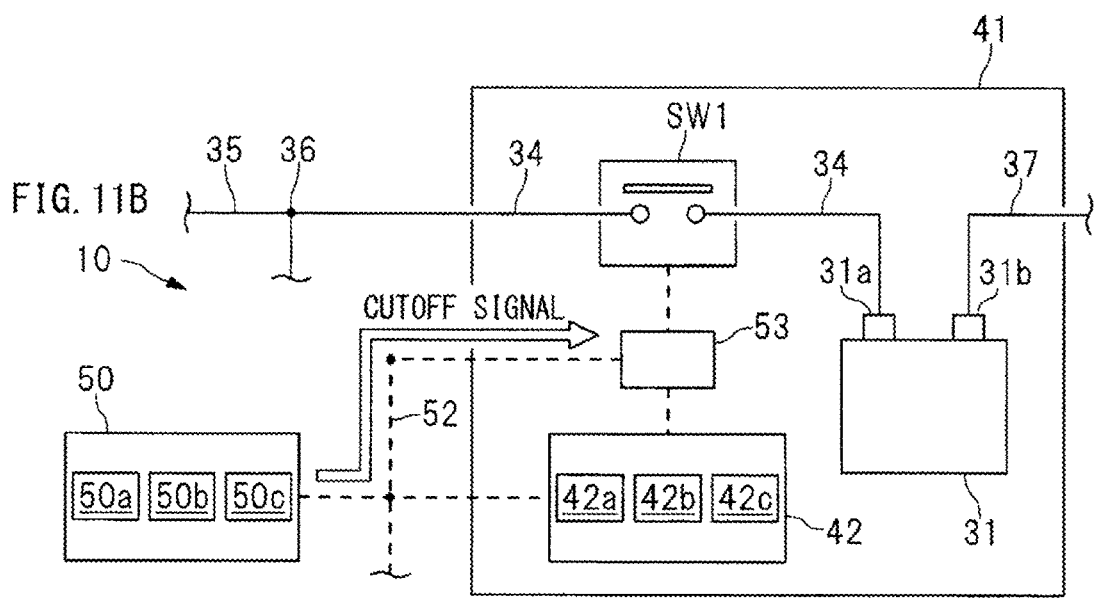

Referring specifically to FIG. 11A, when the engine controller 50 is unable to receive the response signal from the battery controller 42 (as denoted by an arrow β) after the confirmation signal is transmitted from the engine controller 50 to the battery controller 42 (as denoted by an arrow α), it is difficult to control the switch SW1 by the battery controller 42, in consideration of a situation where the self-diagnostic unit 42b is malfunctioning and a possible failure in proper detection of the malfunction of the first switch controller 42a. Hence, the cutoff signal may be transmitted from the second switch controller 50c of the engine controller 50 to the drive circuit 53 as illustrated in FIG. 11B to thereby cause the switch SW1 to be switched from the electrically conductive state to the cutoff state by the engine controller 50. Thus, the switch SW1 may be cut off in advance by the engine controller 50 as an alternative controller when the battery controller 42 involves difficulties in controlling the switch SW1, making it possible to protect the lithium-ion battery 31 appropriately.

Referring back to FIG. 9, the flow may proceed to step S14 when the determination is made in step S13 that the engine controller 50 receives the response signal properly, i.e., when the self-diagnostic unit 42b of the battery controller 42 is determined as being normal (step S13: Y). In step S14, the communication monitor 50b of the engine controller 50 may determine the presence of the abnormality of the communication which serves as the example malfunction of the communication network 52. The flow may proceed to step S11 when the determination is made in step S14 that the abnormality of the communication is present, in consideration of difficulties in sensing a status of operation of the battery controller 42 by the engine controller 50 (step S14: Y). In step S11, the cutoff signal may be transmitted from the second switch controller 50c to the switch SW1, causing the switch SW1 to be switched to the cutoff state by the engine controller 50.

Figure 12A:
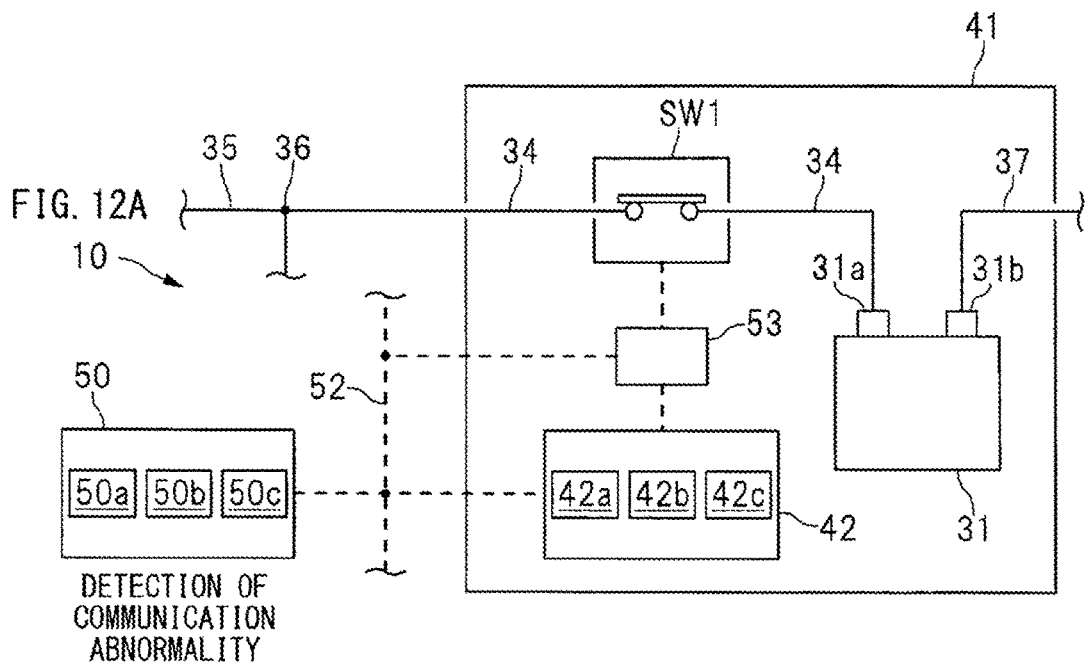
FIGS. 12A and 12B illustrate an example of the course of cutting off the switch SW1 by means of the fail-safe control.
Figure 12B:
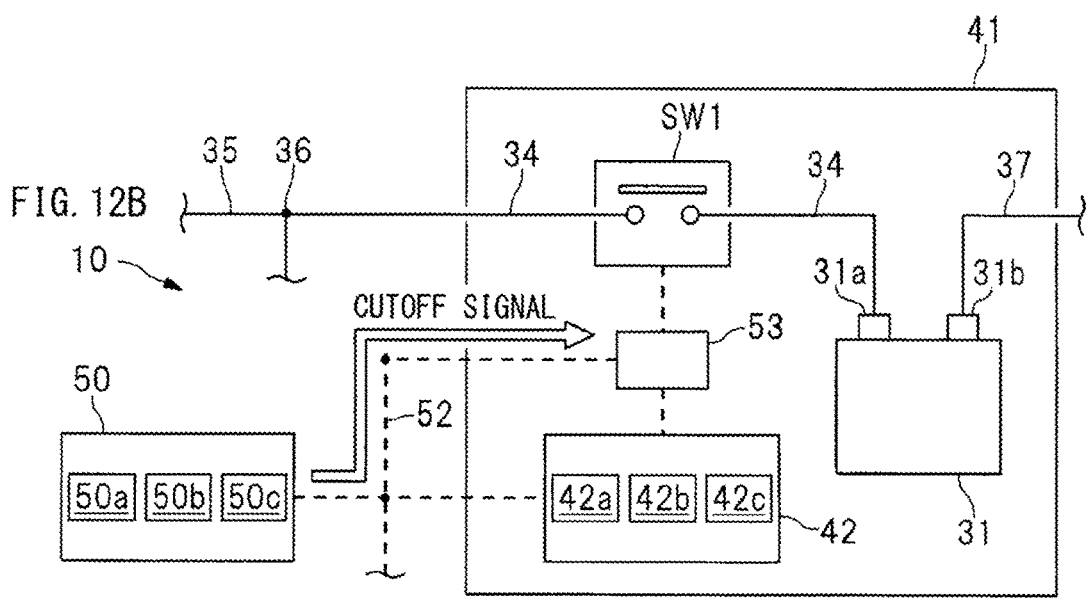

Referring specifically to FIG. 12A, when the abnormality of the communication is detected by the engine controller 50, it is difficult to control the switch SW1 by the battery controller 42 in consideration of a situation where accurate understanding of a status of operation of the first switch controller 42a, the self-diagnostic unit 42b, or both is difficult. Hence, the cutoff signal may be transmitted from the second switch controller 50c of the engine controller 50 to the drive circuit 53 as illustrated in FIG. 12B to thereby cause the switch SW1 to be switched from the electrically conductive state to the cutoff state by the engine controller 50. Thus, the switch SW1 may be cut off in advance by the engine controller 50 as an alternative controller when the battery controller 42 involves difficulties in controlling the switch SW1, making it possible to protect the lithium-ion battery 31 appropriately. When the determination is made in step S14 that the abnormality of the communication is not present (step S14: N), the electrically conductive state of the switch SW1 may be maintained without switching the switch SW1 from the electrically conductive state to the cutoff state.

Although some implementations of the technology have been described in the foregoing with reference to the accompanying drawings, the technology is by no means limited to the implementations described above. Various changes and modifications may be made to any implementation without departing from the scope of the technology. For example, in an example implementation described above, the battery controller 42 is adopted as the first control unit and the engine controller 50 is adopted as the second control unit; however, this is not limitative. In an alternative implementation, other controllers may be employed as the first control unit and the second control unit. Further, in an example implementation described above, the lithium-ion battery 31 and the lead battery 32 are configured to be coupled to the power supply circuit 30; however, this is not limitative. In an alternative implementation, only the lithium-ion battery 31 may be configured to be coupled to the power supply circuit 30. Further, in an example implementation described above, the lithium-ion battery 31 is adopted as the first electricity storage device and the lead battery 32 is adopted as the second electricity storage device; however, this is not limitative. In an alternative implementation, any other type of battery or capacitor may be adopted. In an illustrated example implementation, the switch SW1 is provided on the positive electrode line 34 of the lithium-ion battery 31; however, this is not limitative. In an alternative implementation, as indicated by an alternate long and short dashed line in FIG. 2, the switch SW1 may be provided on the negative electrode line 37 of the lithium-ion battery 31.

According to at least one implementation, a second control unit includes a second cutoff controller that transmits a cutoff signal to a switch when a self-diagnostic unit detects a malfunction of a first cutoff controller. Thus, the switch is cut off in advance by the second control unit when a first control unit involves difficulties in cutting off the switch, making it possible to protect an electricity storage device.

The battery controller 42, the engine controller 50, the ISG controller 24, and the main controller 51 illustrated in FIG. 1 are each implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the battery controller 42, the engine controller 50, the ISG controller 24, or the main controller 51. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the battery controller 42, the engine controller 50, the ISG controller 24, or the main controller 51 illustrated in FIG. 1.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle control apparatus to be mounted on a vehicle, the vehicle control apparatus comprising:
    a power supply circuit comprising a first electricity storage device, a second electricity storage device configured to be coupled to the power supply circuit in parallel to the first electricity storage device and having internal resistance that is larger than internal resistance of the first electricity storage device, and a motor generator coupled to the and second electricity storage devices;
    a switch disposed in the power supply circuit and switchable between an electrically conductive state that allows the first electricity storage device to be coupled to the motor generator and a cutoff state that allows the first electricity storage device to be isolated from the motor generator;
    a drive circuit configured to control the switch into the electrically conductive state upon receiving an electric-conduction signal, and configured to control the switch into the cutoff state upon receiving a cutoff signal;
    a battery controller including a first switch controller and a self-diagnostic unit, the first switch controller being configured to transmit the electric-conduction signal or the cutoff signal to the drive circuit, the self-diagnostic unit being configured to detect a malfunction of the first switch controller; and
    an engine controller coupled to the battery controller through a communication network and configured to control an engine of the vehicle, the engine controller including a second switch controller configured to transmit the cutoff signal to the drive circuit, wherein
    the battery controller transmits the electric-conduction signal to the drive circuit to control the switch into the electrically conductive state in a case where the motor generator is controlled with charge and discharge of the first electricity storage device, while the battery controller transmits the cutoff signal to the drive circuit to control the switch into the cutoff state from the electrically conductive state in a case where the charge and discharge of the first electricity storage device is stopped to protect the first electricity storage device,
    in a case where the engine controller determines the first switch controller, the self-diagnostic unit, or the communication network as being malfunctioning in accordance with a fail-safe control performed at every predetermined cycle, the engine controller transmits the cutoff signal from the second switch controller to the drive circuit to control the switch into the cutoff state from the electrically conductive state even in a state where the first switch controller transmits the electric-conduction signal to the drive circuit, so that the first electricity storage device is isolated from the motor generator with the second electricity storage device coupled to the motor generator, and
    in the fail-safe control,
        a determination is made as to whether a malfunction signal is received from the self-diagnostic unit, the malfunction signal indicating that the first switch controller is malfunctioning, and when the first switch controller is determined as being malfunctioning with a receipt of the malfunction signal, the switch is controlled into the cutoff state from the electrically conductive state,
        a determination is made as to whether a response signal is received from the self-diagnostic unit after a confirmation signal is transmitted to the self-diagnostic unit, and, when the self-diagnostic unit is determined as being malfunctioning with no receipt of the response signal, the switch is controlled into the cutoff state from the electrically conductive state, and
        a determination is made as to whether the communication network is malfunctioning and, when the communication network is determined as being malfunctioning, the switch is controlled into the cutoff state from the electrically conductive state.

2. A vehicle control apparatus to be mounted on a vehicle, the vehicle control apparatus comprising:
    power supply circuit comprising a first electricity storage device, a second electricity storage device configured to be coupled to the power supply circuit in parallel to the first electricity storage device and having internal resistance that is larger than internal resistance of the first electricity storage device, and a motor generator coupled to the first and second electricity storage devices;
    a switch disposed in the power supply circuit and switchable between an electrically conductive state that allows the first electricity storage device to be coupled to the motor generator, and a cutoff state that allows the first electricity storage device to be isolated from the motor generator;

a drive circuit configured to control the switch into the electrically conductive state upon receiving an electric-conduction signal, and configured to control the switch into the cutoff state upon receiving an a cutoff signal;

a battery controller configured to transmit the electric-conduction signal or the cutoff signal to the drive circuit, and detect its own malfunction; and an engine controller coupled to the battery controller through a communication network and configured to control an engine of the vehicle, and configured to transmit the cutoff signal to the drive circuit, wherein the battery controller transmits the electric-conduction signal to the drive circuit to control the switch into the electrically conductive state in a case where the motor generator is controlled with charge and discharge of the first electricity storage device, while the battery controller transmits the cutoff signal to the drive circuit to control the switch into the cutoff state from the electrically conductive state in a case where the charge and discharge of the first electricity storage device is stopped to protect the first electricity storage device, in a case where the engine controller determines the battery controller or the communication network as being malfunctioning in accordance with a fail-safe control performed at every predetermined cycle, the engine controller transmits the cutoff signal to the drive circuit to control the switch into the cutoff state from the electrically conductive state even in a state where the battery controller transmits the electric-conduction signal to the drive circuit, so that the first electricity storage device is isolated from the motor generator with the second electricity storage device coupled to the motor generator, and in the fail-safe control, a determination is made as to whether a malfunction signal is received from the battery controller, the malfunction signal indicating that the battery controller is malfunctioning, and when the battery controller is determined as being malfunctioning with a receipt of the malfunction signal, the switch is controlled into the cutoff state from the electrically conductive state, a determination is made as to whether a response signal is received from the battery controller after a confirmation signal is transmitted to the battery controller, and, when the battery controller is determined as being malfunctioning with no receipt of the response signal, the switch is controlled into the cutoff state from the electrically conductive state, and a determination is made as to whether the communication network is malfunctioning, and, when the communication network is determined as being malfunctioning, the switch is controlled into the cutoff state from the electrically conductive state.

* * * * *